(12) United States Patent
Burchard et al.

(10) Patent No.: US 7,786,881 B2
(45) Date of Patent: Aug. 31, 2010

(54) CONTENT STATUS PROVISION RELATED TO VOLATILE MEMORIES

(75) Inventors: Artur Burchard, Eindhoven (NL); Jozef Pieter Van Gassel, Eindhoven (NL); Siarhei Yermalayeu, Eindhoven (NL); Henrikus Bernardus Van den Brink, Eindhoven (NL); Ozcan Mesut, Eindhoven (NL); Steven Broeils Luitjens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 713 days.

(21) Appl. No.: 11/575,498

(22) PCT Filed: Sep. 8, 2005

(86) PCT No.: PCT/IB2005/052940

§ 371 (c)(1),
(2), (4) Date: Mar. 19, 2007

(87) PCT Pub. No.: WO2006/030356

PCT Pub. Date: Mar. 23, 2006

(65) Prior Publication Data

US 2009/0179754 A1 Jul. 16, 2009

(30) Foreign Application Priority Data

Sep. 17, 2004 (EP) .................................. 04104504

(51) Int. Cl.
*G08B 21/00* (2006.01)

(52) U.S. Cl. .............................. 340/636.1; 340/636.19; 340/540; 340/541; 340/460; 340/461; 713/165; 713/300; 713/340

(58) Field of Classification Search .............. 340/636.1, 340/636.19, 540, 460, 461; 713/165, 300, 713/340
See application file for complete search history.

(56) References Cited

U.S. PATENT DOCUMENTS

| 5,655,749 | A | 8/1997 | Mauerhofer |
| 6,947,181 | B1 * | 9/2005 | Sato ........................... 358/400 |
| 2002/0057769 | A1 * | 5/2002 | Bhatoolaul et al. ....... 379/88.12 |
| 2003/0229813 | A1 | 12/2003 | Shiiyama |

FOREIGN PATENT DOCUMENTS

| EP | 1498743 A2 | 1/2005 |
| JP | 11178223 A | 7/1999 |
| WO | 2004114639 A1 | 12/2004 |

* cited by examiner

Primary Examiner—Tai T Nguyen

(57) ABSTRACT

The present invention relates to a method, a content status information providing unit (100), a portable electronic device (114), a computer program product (50) and a computer program element for providing status information related to at least one data content file, within a portable electronic device (114), to a user, the method comprising the steps of obtaining a battery capacity value (step 206), obtaining content related information for at least one data content file (steps 214, 216), determining a content status of the' at least one data content file, in dependence of the obtained battery capacity related to the at least one data content file (steps 222, 226, 233, 234), and providing information on the determined content status to the user (step 224), such that the user of the portable electronic device (114) can be made aware of the status of the at least one data content file.

22 Claims, 3 Drawing Sheets

Video file C

Video file D

Video file E

Content

Content

Content

CONTENT STATUS PROVISION RELATED TO VOLATILE MEMORIES

FIELD OF THE INVENTION

The present invention relates in general to providing status information related to at least one data content file, and in particular to providing a content status of at least one data content file to a user in dependence of a battery capacity.

BACKGROUND OF THE INVENTION

Varieties of battery-powered portable electronic devices are available on the market. These often include a local storage of the type of a memory capable to contain multimedia content. Such content can be loaded to the devices' storage and subsequently consumed, for instance by playing back the content.

Until now for the reason of non-volatility, flash-based memories were used. The flash-based memories however have a rather high price, as compared to for example dynamic random access memories (DRAM)-based memories. On the other hand, these DRAM-based memories are volatile, that is the data content is lost if the power supplied to memory decreases below a certain low-level threshold for instance upon consumption of power or simply shutting down the power supply.

As mentioned above, the data content is lost if the power supplied to the memory reaches a low-level threshold when decreasing. However, in order to avoid losing data content a data retention power threshold may also be used. When the power supplied to the memory first reaches this data retention data threshold, power will be economized and supplied to the DRAM-based memory to refresh the memory and hence avoid data being. In this retention state, data is not accessible to the user, rather the data is locked. If however the power supplied to the battery decreases further and reached the low-level threshold data is nevertheless lost.

Several ways to communicate the level or capacity of the battery used, exist.

In "Method for determining when a smart battery is discharged below it's critical low capacity" by Seng Pao Xiong, one way to communicate capacity to a user by using a functionality of a LED display, a host device can determine the capacity of a battery.

This way of communication thus concerns communicating information on the battery capacity as such. What the user is eager to find out is whether the battery capacity is enough to listen to a song or to watch a film before the battery runs flat. Seng Pao Xiong therefore has the disadvantage since it is not communicating information related to any available content files.

SUMMARY OF THE INVENTION

It is an object of the present invention to provide a user with information on the availability status of at least one data content file in relation to an obtained battery power capacity.

According to a first aspect of the present invention, this object is achieved by a method for providing status information related to at least one data content file, within a portable electronic device, to a user, said method comprising the steps of obtaining a battery capacity value, obtaining content related information for at least one data content file, determining a content status of the at least one data content file, in dependence of the obtained battery capacity related to the at least one data content file, and providing information on the determined content status to the user, such that the user of the portable electronic device can be made aware of the status of the at least one data content file.

According to a second aspect of the present invention, this object is achieved by a content status information providing unit for providing status information related to at least one data content file within a portable electronic device to a user, comprising a battery level comparing unit, arranged to obtain a battery capacity value from a battery, a content status determining unit, connected to the battery comparing unit, arranged to obtain content related information for at least one data content file, to determine content status in dependence of the battery capacity and the obtained content related information for at least one data content file, and to provide the determined content status to a data presenting unit, and a control unit, connected to the battery level comparing unit and the content determining unit, arranged to control the steps of obtaining the battery capacity value, obtaining content related information, determining the content status and providing information on the determined content status, so that the user of the portable electronic device can be made aware of the content status of the at least one data content file.

According to a third aspect of the present invention, this object is achieved by a portable electronic device comprising a content status information providing unit for providing status information related to at least one data content file within a portable electronic device to a user, comprising a battery level comparing unit, arranged to obtain a battery capacity value from a battery, a content status determining unit, connected to the battery unit, arranged to obtain content related information for at least one data content file, to determine content status in dependence of the battery capacity value and the obtained content related information for at least one data content file, and to provide the determined content status to a data presenting unit, and a control unit, connected to the battery level comparing unit and the content determining unit, arranged to control the steps of obtaining the battery capacity value, obtaining content related information, determining the content status and providing information on the determined content status, so that the user of the portable electronic device can be made aware of the content status of the at least one data content file.

According to a fourth aspect of the present invention, this object is achieved by a computer program product comprising a computer readable medium, having thereon computer program code means, to make a portable electronic device execute, when said computer program code means is loaded in the portable electronic device: obtaining a battery capacity value, obtaining content related information for at least one data content file, determining content status information, in dependence of the obtained battery capacity related to the at least one data content file, and providing the generated content status information to the user, such that a user of the portable electronic device can be made aware of the status of the at least one data content file.

According to a fifth aspect of the present invention, this object is achieved by a computer program element comprising computer program code means to make a portable electronic device execute: obtaining a battery capacity value, obtaining content related information for at least one data content file, determining of content status information, in dependence of the obtained battery capacity related to the at least one data content file, and providing of the generated content status information to the user, such that a user of the portable electronic device can be made aware of the status of the at least one data content file.

The present invention has the following overall advantages:

It is an advantage of the present invention as compared to the prior art that the present invention offers providing a content status to the user in dependence of the battery capacity value.

It is a further advantage that a user can become aware of the status of the content itself of a portable electronic device.

Direction of the dependent claims and the advantages thereof:

The claims 4 and 13 are directed towards obtaining a consumption size in relation to an obtained battery power capacity value.

These claims have the advantage that the battery power capacity is converted to a file size that is consumable by the obtained battery power capacity, enabling easy comparison with the size of the data content available.

The claims 6, 7, 8, 15, 16 and 17 are directed towards determining what amount of the at least one data content is accessible to the user.

Providing information to which extent the at least one data content file is accessible, is an advantage since this enables providing that that the data content file is accessible in parts only.

It is also advantageous to provide information that the full amount of the at least one data content file is not accessible to the user if a size related quota is smaller than a first threshold, since this information may be provided when the at least one data content file is locked to the user.

The claims 9, 10, 11, 18, 19 and 20 are directed towards relating the obtained battery capacity to a first and a second threshold.

These claims provide an advantage in that a status whether the battery capacity level has reached a retention level or a data lost-related, level, is determined.

The gist of the present invention is to be able to provide information a low battery capacity to the user in terms of what degree of the content being available to the user.

These and other aspects of the invention will be apparent from and elucidated with reference to the embodiments described hereinafter.

BRIEF DESCRIPTION OF THE DRAWINGS

The present invention will now be described in more detail in relation to the enclosed drawings, in which.

DESCRIPTION OF PREFERRED EMBODIMENTS

Figure 1:
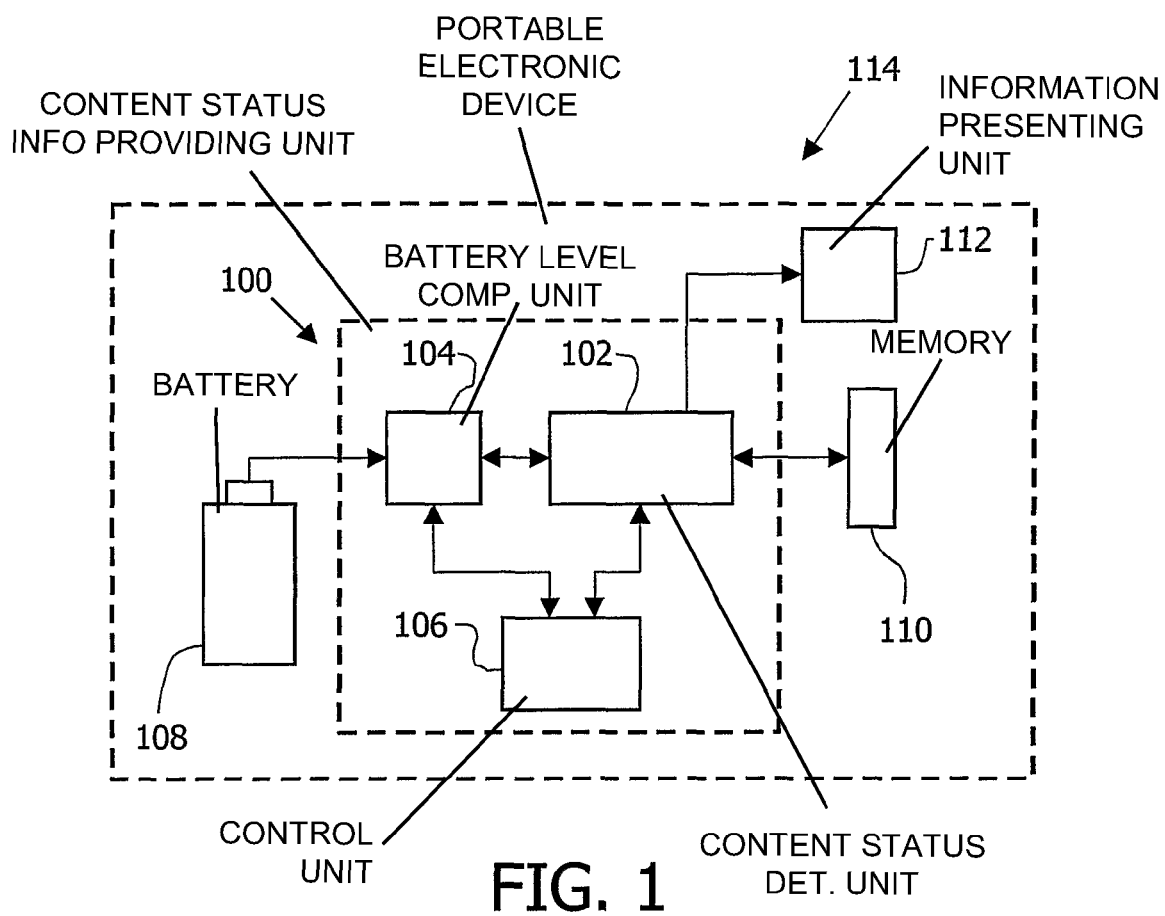
FIG. 1 shows a schematic representation of a portable electronic device according to one embodiment of the present invention.

The present invention relates in general to providing status information related to at least one data content file, and in particular to providing a content status of at least one data content file to a user in dependence of a battery capacity.

Portable electronic devices equipped with a memory of dynamic random access memory (DRAM) type, need to continuously supply the DRAM-type memory with electrical power in order not to lose the content of the memory since the content of this type of memory is volatile in the sense that switching off the power supply to the memory deletes the memory content.

Since the DRAM-type memories are considerably cheaper than non-volatile flash-based memories, the DRAM-type memories have a potential to find applications in a vast number of small size portable devices.

These small size portable devices generally contain a battery to provide the device with electrical power. Due to the power consumption of the device, the battery power level decreases upon using the device.

Further, more battery power is required to fully consume big files than small files, since big files generally are consumed during a longer time duration. Also, the type of file or the file format plays an essential role, since for instance a video format file requires a display to be supplied with electric power also during the file consumption. Further, different file processing units such as mp3-processing units and video format processing units consume different amounts of power, per se. Different files may thus require different amounts of battery power per time interval or per kilobyte of consumed data. Since it can be easily obtained for each device, by calculating, measuring or by monitoring, for instance, how much power the processing units and displays consume, these consumptions are taken into account in the determination of the amount of content files which can be consumed for a given battery power.

Upon consumption of battery power, the power level may decrease below a certain threshold below which the data content files no longer can be consumed in their entirety, since they simply require more battery power than the remaining battery power. However, even though entire files can no longer be consumed, part of files may be accessible, which parts depend on the remaining battery power capacity. It goes without saying that the largest files or the file that requires the highest battery power level to be consumed, are affected at first.

If the battery power level decreases further, it is determined that the remaining battery capacity is not enough to access any files, if any, in their entirety, for the reason as explained above. With decreasing power levels, the extent of the data files, which can be accessed with the remaining battery capacity, decreases. How big a part of the files which still can be accessed by the user differs from one file to the other, as the files typically have different sizes and also may have different formats.

If the battery power level decreases further, the battery power level may pass a threshold, below which the content of the memory is inaccessible to the user. The content is now locked to the user and cannot be accessed unless the electronic portable device, such as for instance an mp3-player encompassing the present invention, is supplied with a higher battery power level, by exchanging batteries, by charging the batteries, by plugging it into an external high power source, such as the mains. The remaining battery power capacity is simply too low to start a file processing of a file of any format, rather the battery power level has passed a threshold, beyond which the remaining battery power capacity is economized and used to supply the volatile memory with electric power, in order not to jeopardize the user's memory content.

As the DRAM type memories are volatile, if the battery power level decreases even more and approaches zero, the remaining battery power capacity eventually becomes too low to ensure a reliable refreshing of the memory, and the content inevitably is lost.

The present invention may provide a user of a portable electronic device, such as an mp3-player, information on the battery capacity of the player in relation to the accessibility of the content that the user is interested in accessing, rather than merely providing a figure of how many percent of the total battery capacity is still available, which the user finds difficult to relate to. High battery power levels are sufficient to access to all files in their entirety, whereas low battery levels may show to be insufficient for consuming certain files in their entirety or sufficient for consuming parts of these files.

With reference made to FIG. 1, showing a schematic representation of a portable electronic device according to one embodiment of the present invention, the present invention will be explained in more detail.

The portable electronic device 114 in FIG. 1 comprises a content status information providing unit 100, a battery 108, a DRAM-type memory 110, and information presenting unit 112. The content status information providing unit comprises a battery power level comparing unit 104 is arranged to obtain a battery power capacity related to the battery 108. In this example, the portable electronic device 114 is a dedicated content processing device arranged to decode media content files such as mp3-files. Other types of media content files may also be decoded such as mp2, ogg, wav, mod, xm, it, s3m and MS Windows Media audio files. In this example, the portable electronic device 114 is hence a dedicated mp3-audio player, but it may be any portable electronic device, such as a portable video player, a portable computer, etc.

There is no strict memory-type requirement for the present invention. However, it is exemplified in relation to a portable electronic device being equipped with at least one volatile memory such as a DRAM-type memory.

Examples of different memories of this type for which the present invention can be applied are Synchronous DRAM (SDRAM), Double Data Rate SDRAM (DDR-SDRAM) and Double Data Rate 2-SDRAM (DD-SDRAM) memories.

Moreover, the content status information providing unit 100 is comprised of a content status determining unit 102, arranged to obtain content related information for at least one data content file, a battery level comparing unit 104, connected to the content status determining unit 102, and arranged to obtain a battery capacity. The content status information providing unit is further comprised of a control unit 106 that is connected to the content status determining unit 102 and the battery level comparing unit 104, said control unit 106 being arranged to control the function of the content status determining unit 102 and the battery level comparing unit 104, so that the user of the portable electronic device 114, here the mp3-player, can be made aware of the status information of the at least one data content file.

The functions of each of these units, that is the content status determining unit 102, the battery level comparing unit 104, and the control unit 106 are explained in more detail below in connection with the detailed description of the method for providing status information related to at least one data content file according to one embodiment of the present invention.

Figure 2:
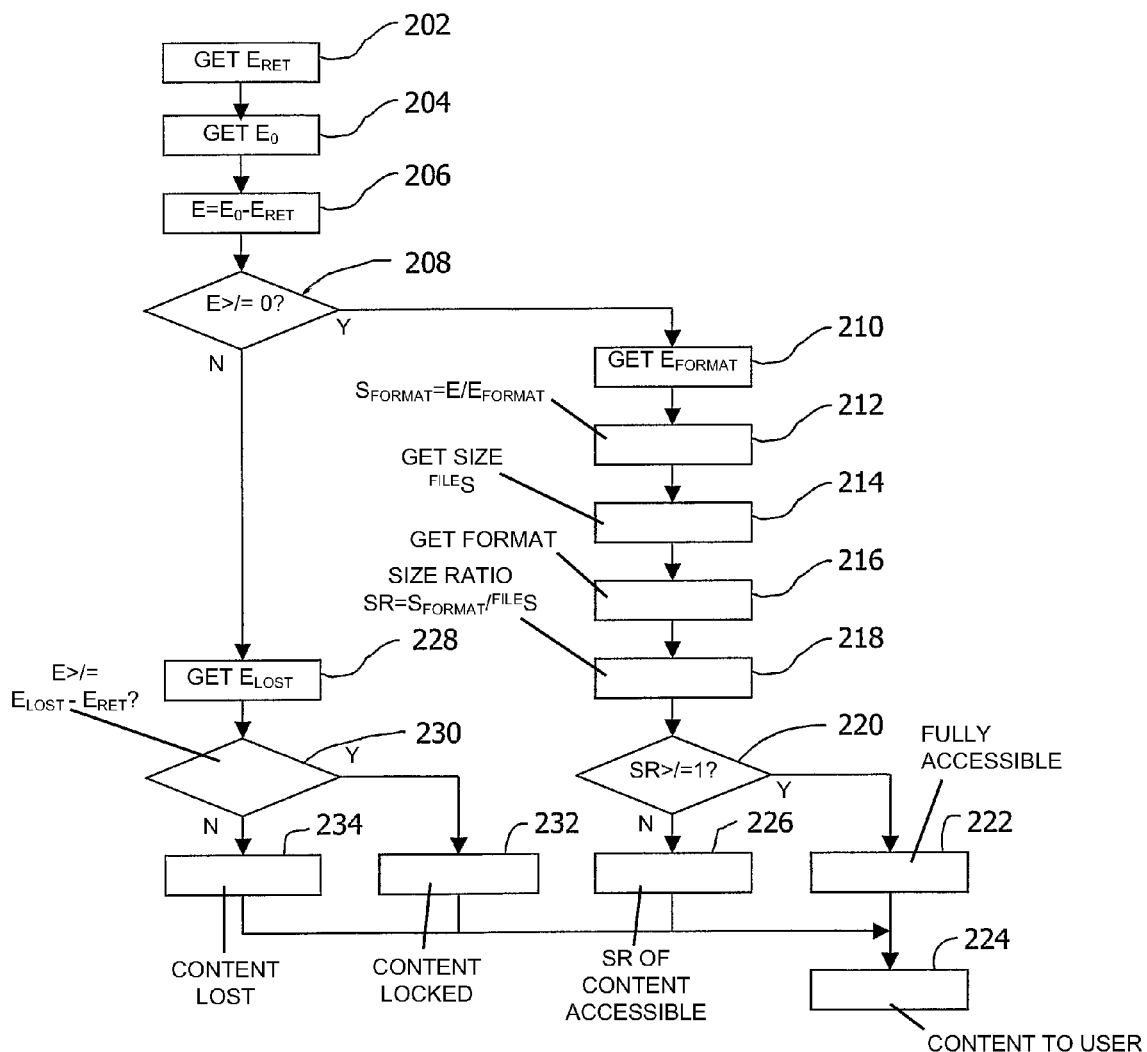
FIG. 2 presents a flow-chart of a method for providing status information related to at least one data content file, in relation to one embodiment of the present invention.

Reference is now also given to FIG. 2, and to Table 1, presenting the flow-chart of the method for providing status information related to at least one data content file, in relation to one embodiment of the present invention, and a listing of brief task descriptions of the steps in said method, according to one embodiment of the present invention.

TABLE 1

Listing of brief task descriptions of the steps in the method, according to one embodiment of the present invention.

| STEP NO. | SHORT TASK DESCRIPTIONS |
|---|---|
| 202 | Obtaining a data retention battery power threshold, $E_{RET}$ |
| 204 | Obtaining a battery power gross capacity value, $E_0$ |
| 206 | Obtaining an activity related battery power capacity, E, $E = E_0 - E_{RET}$ |
| 208 | Is $E \geq 0$? |
| 210 | Obtaining power consumption/kB for available data formats, $E_{FORMAT}$ |
| 212 | Obtaining consumption size per data format, $S_{FORMAT} = E/E_{FORMAT}$ |
| 214 | Obtaining size of the at least one data content file, $^{FILE}S$ |
| 216 | Obtaining format of the at least one data content file, FORMAT |
| 218 | Determining size ratio for data content file format, FORMAT, $SR = S_{FORMAT}/^{FILE}S$ |
| 220 | Is $SR \geq 1$? |
| 222 | Setting content status: Fully accessible |
| 224 | Providing content status to the user |
| 226 | Setting content status: SR of data content file accessible |
| 228 | Obtaining lose content-related battery power threshold, $E_{LOST}$ |
| 230 | Is $E \geq E_{LOST} - E_{RET}$? |
| 232 | Setting content status: Data content locked |
| 234 | Setting content status: Data content lost |

The first step of said method according to one embodiment of the present invention is the step of obtaining a data retention battery power threshold, $E_{RET}$, step 202, by the battery power comparing unit 104. This data retention battery power threshold may be obtained from the control unit 106 or may be obtained from a user of the electronic device 114 via user input interface (not shown) of the electronic device 114. Other alternative paths through which the data may be accessed may also be possible.

It shall be pointed out already at this stage that the order of certain steps comprised in the method for providing content status information according to this embodiment may be changed without affecting the effect of the present invention.

The subsequent step in the flow-chart in FIG. 2 is the step of obtaining a battery power gross capacity value, $E_0$, step 204. This battery power gross capacity value is in this example obtained directly from the battery, but may be obtained via another unit within the portable electronic device 114. The next step of the method is the step of obtaining an activity related battery power capacity, E, step 206, where E equals the battery power gross capacity value, as obtained in the step 204, minus the data retention battery power threshold, $E_{RET}$, that is $E=E_0-E_{RET}$. According to this embodiment of the present invention step 206 is performed by the battery level comparing unit 104 of the content status information providing unit 100. According to another embodiment this activity related battery power capacity, E, may be obtained by another unit exterior to the content status information providing unit 100, but within the portable electronic device 114. The subsequent step is the step of determining whether $E \geq 0$, or not, step 208. In this embodiment, it is the battery level comparing unit 104 that performs this step. There may however be other units of the portable electronic device 114 responsible for such a determination, in analogy with the case of steps 204 and 206, as well.

In the case the activity related battery power capacity E is determined to be larger than 0, the step of obtaining information of the power consumption per unit size $E_{FORMAT}$, step 210, for instance per kB, for each available data format, FORMAT, is executed. This step of obtaining power consumption information is performed by the content status determining unit 102. The power consumption information is advantageously stored in beforehand, prior to executing the method and the power consumption information is hence accessed in the step of obtaining in one embodiment of the present invention. Moreover, this information as obtained by the content status determining unit 102, may be obtained by another unit. As indicated above the power consumption per unit size may vary from one format to another, for which reason the power consumption per unit size is obtained for the available found available.

Having access to the power consumption per unit size for at least one file format the step of obtaining a consumption size for each format, $S_{FORMAT}$, being defined as $S_{FORMAT}=E/E_{FORMAT}$, is performed, step 212. In this step it is thus obtained the size related to each format for which the battery power capacity, E is sufficient to supply the memory during the entire consumption of a file of said size.

Subsequently the step of obtaining the size of the at least one data content file, $^{FILE}S$, step 214, is performed by the content status determining unit 102 from content related information from the memory, 110. It should be noted that size information related to the memory content is a common parameter, which means that size information is easily available and thus does not require additional converting processing in order to obtain it.

Also the format of the at least one data content file, FORMAT, is obtained in the step of obtaining the format of the at least one data content file, step 216, again performed by the content status determining unit 102 from content related information obtained from the memory 110.

Having obtained the file size, $^{FILE}S$ and file format, FORMAT, of the at least one data content file, the step of determining a size ratio SR defined as $SR=S_{FORMAT}/^{FILE}S$, step 218, is performed by the content status determining unit 102. In this embodiment of the present invention the activity related battery power capacity E, is thus converted to a format dependent size, $S_{FORMAT}$ that is compared to the size of the at least one data content file.

Afterwards, the step of determining whether the size ratio SR is larger than or equals 1, or not, step 220, is performed by the content status determining unit 102. If this size ratio, SR is larger than or equals 1, the subsequent step of setting the content status to "Fully accessible", step 222 is performed by the content status determining unit 102. This content status information, is thereafter presented to the user in the step of providing content status to the user, step 224, performed by the information presenting unit 112 of the electronic device 114, see Table 2.

TABLE 2

Schematic presentation of information presented by the presenting unit 112 of the electronic device 114.

| Data content A | Fully accessible |
|---|---|

If however the size ratio SR is smaller than 1, the step of setting the content status to "SR of data content file accessible", step 226, is performed by the content status determining unit 102. In this case, the size ratio equals to the part of the data content file, which is accessible to the user. This content status information is then presented to the user in the following step, step 224, as described in the paragraph above, see Table 3.

TABLE 3

Schematic presentation of information as determined in step 226 presented by the presenting unit 112 of the electronic device 114.

| Data content A | 0.72 of data content file accessible |
|---|---|

Further, as an alternative to relating the activity related battery power capacity, E to the battery power consumption per unit size for a specific format, FORMAT, $E_{FORMAT}$, thus obtaining $S_{FORMAT}$, according to step 212, as explained above, the battery capacity with a required parameter related to a stored file in the memory, in terms of battery power capacity or size, is to convert the activity related power into consumption minutes for each file format and to covert the file size to minutes required to consume the whole file or parts of the file, after which a comparison is performed by the content status determining unit 102.

The content status for various data content files may be presented in various ways according to different alternatives of the present invention. The information as presented by the presenting unit 112 may comprise the time duration of files, during which the files can be consumed from the activity related battery power capacity as obtained. Information about the total length or duration of files may be obtained directly from the memory in the step of obtaining content related information or may be calculated from information of the size of the file, as the consumption rate in size per unit time is well known.

In Table 4 such information is presented in relation to two files, a video file A and an audio file B. the Video file A is accessible to an amount of 25% corresponding to a duration of 25 minutes. The activity related battery power capacity is enough to supply the electronic portable device with power during a time that is enough to consume the entire audio file B. The accessibility of the audio file B is thus 100%, which in this example corresponds to a duration of 3 minutes 25 seconds.

TABLE 4

Schematic presentation of information presented by the presenting unit 112 of the electronic device 114.

| FILE | ACCESSIBLE (%) | TIME (m:s) |
|---|---|---|
| Video file A | 25 | 25:00 |
| Audio file B | 100 | 3:25 |

More variations of the presenting of content status information are schematically shown in Table 5. This information also contains the total length of the presented file, where this time information is related to the accessible duration of each file.

TABLE 5

Schematic presentation of content status information to be presented by the presenting unit 112 of the electronic device 114.

| FILE | ACCESSIBLE/TOTAL (h.m:s) |
|---|---|
| Video file A | 25:00/1.40:00 |
| Audio file B | 3:25/3:25 |

Figure 3:
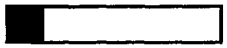
FIG. 3 shows a schematic bar representation of the content status of three video files.
Figure 3:
Figure 3:

Additional alternatives of content status information presentable to the user of the portable electronic device are presented in FIG. 3. In this figure, bars indicating the accessible amount of each respective file are presented. In this information, a video file C is larger in size than a video file D that itself is larger than a video file E. The part of each bar being filled indicates the part of each full duration, which can be accessed by the battery power capacity available. As the video file C is larger than the video file D, the bar for video file C is shorter than the bar for the video file D. Similarly the bar for the video file E is longer than the one for video file D, as this video file E has a shorter total duration than video file D.

Having determined the content status information for a data content file available in the DRAM-based memory, several options are thus available to present said information to the user. According to yet another embodiment of the present invention, such content status information may be comprised within a file system. Since file systems may be available in the portable electronic devices to facilitate the browsing of files to the user, or for other reasons, information on the content status may well be presented together with other file attributes, such as artist name, song name, file size, duration, date when obtained etc., to mention a few. As indicated above, the content status information may be presented by a colour coded indicator, by the part of the file which is accessible, by the consumable time length of the file in point, or in possible combinations thereof. By for example an additional column in a file system, such content status information may be conveniently presented to the user.

Returning to the flow-chart of the method as presented in FIG. 2, if the activity related battery power capacity E, as defined as $E=E_0-E_{RET}$ is determined to be negative in step 208, the step of obtaining a lose content-related battery power threshold, $E_{LOST}$, step 228, is performed by the battery level comparing unit 104. This lose content related battery power threshold $E_{LOST}$ may for instance be provided in beforehand by the control unit 106 or be provided during the stage of manufacturing of the battery level comparing unit 104, and is related to the type of volatile memory in point.

Having obtained this lose content-related battery power threshold, $E_{LOST}$, the step of determining whether the activity related battery power capacity E is larger than or equal to the lose content-related battery power threshold, $E_{LOST}$, minus the data retention battery power threshold, $E_{RET}$, that is whether $E \geq E_{LOST}-E_{RET}$, or not, step 230, is performed by the battery level comparing unit 104. If the activity related battery power capacity E is determined to be larger than, or equal to, the lose content-related battery power threshold, $E_{LOST}$, minus the data retention battery power threshold, $E_{RET}$, the step of setting the content status to: "Data content locked", step 232, is performed by the content status determining unit 104, see Table 6.

TABLE 6

Schematic presentation of information as determined in step 232 to be presented by the presenting unit 112 of the portable electronic device 114.

| Data file A | Data content locked |
| --- | --- |

If the activity related battery power capacity E is determined to be lower than the lose content-related battery power threshold, $E_{LOST}$, minus the data retention battery power threshold, $E_{RET}$, in step 230, the step of setting the content status to: "Data content lost", step 234, is performed by the content status determining unit 104. Subsequent to the step 232 and step 234, as mentioned above, the step of providing the content status to the user, step 224, also as described above follows. In Table 7, information related to a lost content scenario is presented.

TABLE 7

Schematic presentation of information as determined in step 234 to be presented by the presenting unit 112 of the portable electronic device 114.

| Data file A | Data content lost |
| --- | --- |

Figure 4A:
FIGS. 4A-C present a content status representation for the overall content of a portable electronic device, and FIG. 5 schematically shows a computer program product according to one embodiment of the present invention.
Figure 4B:
Figure 4C:

Within one alternative embodiment of the present invention it is determined whether the activity related battery power capacity is sufficient to consume each one of the available content files, alternatively. Especially if the user is interested in consuming entire files and more so if the files available in the memory 110 have the same format or formats corresponding to similar battery power consumption per unit size when being consumed, an indication whether the content is fully accessible or not fully accessible, that is locked, may be a good way to utilize the battery power capacity available. In such a case, the information as presented by the presenting unit 112, may schematically look like the information as displayed in FIGS. 4A-C. In FIG. 4A it is shown that the content is fully accessible. The box with two interior diagonal lines is a code for a GREEN light indication. This may be communicated to a user by a LED diode, being the presenting unit 112. If the content is not accessible to the user, a schematic representation of the information may look like the one as presented in FIG. 4B. One diagonal line within a box is the code for a YELLOW light indication, meaning that the content is locked to the user. Moreover if it has been determined that the content is lost the content status information to be presented by the presenting unit 112 may be represented in a coded way look like the information as prevented in FIG. 4C. This open box is a code for a NO light indication or alternatively a RED light indication. In this embodiment, the information is visually presented. However, information presented to the user on the status of the overall content, in this example, may be provided by presenting audio information such as tones, short sounds, "peeps", etc. According to another alternative, information may be presented to the user by vibrations. Of course, any combinations of these types of information may be presented to the user, to provide content status information such that the user of a portable electronic device can be made aware of the status of the content.

This method is typically executed by the portable electronic device on a regular basis, for instance, with 1 minute intervall, when the portable electronic device receives user input from a user. Other time intervals are also suitable such as every 30 seconds, 2 minutes, etc. When the portable electronic device is accessing a data content file, the method is executed less regularly according to one embodiment of the present invention. In one alternative the method is not executed during for instance consuming a data content file. When the consumption of the data content file is stopped by, for instance, the user or ends, the method will be executed, in order to present the user of the portable electronic device with updated status information. Also, while the portable electronic device is inactive, that is when no data content files are consumed and no user input is received, the method is not executed, according to one embodiment of the present invention.

The execution frequency of the method may further be dependent of the activity related battery power capacity. According to this alternative embodiment the execution frequency may decrease with a certain decrease of the activity related battery power capacity.

Figure 5:
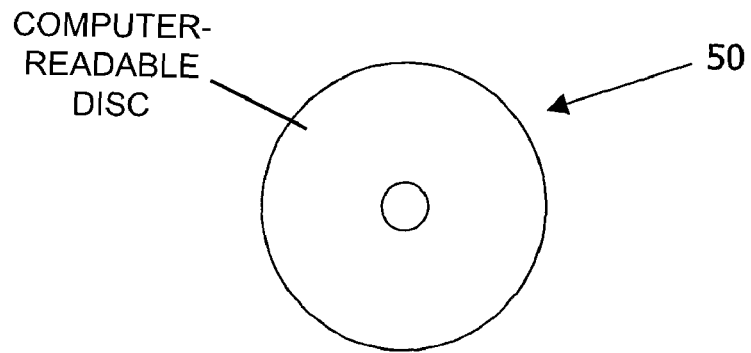

FIG. 5 schematically shows a computer program product according to one embodiment of the present invention, having thereon computer program code means.

When the computer program code means, comprised on the computer program product, is loaded in the computer or possibly the portable electronic device itself, said computer or possibly the portable electronic device itself, executes obtaining a battery capacity value, obtaining content related information for at least one data content file, determining of a content status of the at least one data content file, in dependence of the obtained battery capacity related to the at least one data content file, and providing information on the determined content status to the user, such that the user of the portable electronic device can be made aware of the status of the at least one data content file.

One example of such a computer program product is a CD-ROM, but it can however be any kind of readable disc that can be inserted in a computer, such as a DVD-disc, an MD-disc or any other kind of computer program product. Also the computer program product may be a portable memory, such as a flash-based memory.

The computer typically comprises a control unit, a memory unit and an input/output unit.

In addition, the computer program element according to the present invention may be downloaded from a server via for instance the Internet or any other wired or wireless network. As mentioned earlier and below, information on the battery power consumption in the relevant states of usage, is required in order to provide a portable electronic device with the present invention.

The content status information providing unit may be implemented in the system power manager, as already available in various battery power supplied portable electronic devices. However, the content status information providing unit may be implemented as a unit on its own or even be incorporated in the control unit of portable electronic devices.

It is emphasized that this invention can be varied in many more ways than the ones mentioned and/or described above. These different embodiments and alternatives are non-limiting examples. The scope of the present invention, however, is only limited by the subsequently following claims.

According to further embodiment of the present invention, the battery power capacity required to consume at least one data content file, fully or in part, is calculated and related to the activity related battery power capacity E, available for consuming data content files. In this embodiment a required battery power capacity itself for each data content file are determined. Based on comparison between the required battery power capacity and the available battery power capacity, it is determined content status on whether the entire data content files can be accessed by the user or not.

According to yet another embodiment or the present invention, the activity related battery power capacity, E is related to a battery power consumption per minute for a specific format, FORMAT, $E_{FORMAT}$, thus obtaining $S_{FORMAT}$, in the units J/s. From this obtained parameter it is determined the duration for each format which the can be supported by the available activity related battery power capacity. Since information of the length of each media file, such as audio and video, may easily be obtained from the storage of said files, such a comparison may be beneficial, during the providing of content status information according to the present invention.

In an alternative embodiment of the present invention the relative order of the steps as comprised in the method according to one embodiment is altered without negatively affecting the effect or the result of the method.

The present invention concerns providing status information related to at least one data content file. In one alternative the present invention may however also relate to performing the actual decisions that data content files are accessible, locked, or that some or all have been lost.

It shall be paid attention to that:

"Comprising" or "comprises" does not exclude other elements, steps, units, etc.

"A" or "an" does not exclude a plurality of the respective items.

A single processor or other processing unit may fulfill the functions of several units recited in the claims.

The reference signs in the claims shall not be construed as limiting the scope.

The method, the content status information providing unit, the portable electronic device, the computer program product and the computer program element for providing content status related information related to at least one data content file according to the present invention, have the following advantages:

The user is provided with information enabling him to become aware of the status of the data content.

The present invention further offers providing a content status to the user in dependence of the battery capacity value.

It is a further advantage that the battery power capacity may be converted to a file size that is consumable by the obtained battery power capacity, enabling easy comparison with the size of the data content available.

Providing information to which extent the at least one data content file is accessible, is an advantage since this enables providing that that the data content file is accessible in parts only.

It is also advantageous to provide information that the full amount of the at least one data content file is not accessible to the user if a size related quota is smaller than a first threshold, since this information may be provided when the at least one data content file is locked to the user.

The present invention has another advantage in providing information that the data are locked and that the data are lost, if the battery capacity level has reached a retention level or a data lost-related level, respectively.

The invention claimed is:

1. A method for providing status information related to at least one data content file, within a portable electronic device, to a user, said method comprising steps of:
   obtaining a battery capacity value;
   obtaining content-related information for at least one data content file;
   determining a content status of the at least one data content file, in dependence on the obtained battery capacity related to the at least one data content file; and
   providing information on the determined content status to the user,
   wherein the user of the portable electronic device is made aware of the status of the at least one data content file.

2. The method for providing status information as claimed in claim 1, wherein said content-related information comprises information related to a size of the at least one data content file.

3. The method for providing status information as claimed in claim 1, wherein said content-related information comprises information related to a file format of the at least one data content file.

4. The method for providing status information as claimed in claim 3, wherein said method further comprises a step of:
   obtaining a consumption size in dependence on the obtained battery capacity value and information related to power consumption for at least the file format of the at least one data content file.

5. The method for providing status information as claimed in claim 4, wherein said content-related information comprises information related to a size of the at least one data content file, and wherein said method further comprises a step of:
   determining a size-related quota in dependence on the determined consumption size, and the obtained size of the at least one data content file.

6. The method for providing status information as claimed in claim 5, wherein the step of determining the content status comprises determining an amount of the at least one data content file that is accessible to the user, in relation to the size-related quota.

7. The method for providing status information as claimed in claim 5, wherein the step of determining the content status comprises determining the status that a full amount of the at least one data content file is accessible to the user if the size-related quota is larger than, or equal to, a first threshold.

8. The method for providing status information as claimed in claim 5, wherein the step of determining the content status comprises determining a partial amount of the at least one data content file that is accessible to the user if the size-related quota is smaller than a first threshold.

9. The method for providing status information as claimed in claim 1, wherein said method further comprises a step of:
determining whether or not the obtained battery capacity value is smaller than a first battery threshold and larger than, or equal to, a second battery threshold.

10. The method for providing status information as claimed in claim 9, wherein the step of determining the content status comprises determining the status that the at least content data file is locked to the user, if the obtained battery capacity value is smaller than the first battery threshold and larger than, or equal to, the second battery threshold.

11. The method for providing status information as claimed in claim 9, wherein the step of determining the content status comprises determining the status that the at least content data file is lost, if the obtained battery capacity value is smaller than the second battery threshold.

12. A content status information providing unit for providing status information related to at least one data content file within a portable electronic device to a user, said content status information providing unit comprising:
a battery level comparing unit for obtaining a battery capacity value related to a battery;
a content status determining unit, connected to the battery level comparing unit, for obtaining content-related information for at least one data content file, said content status determining unit determining content status in dependence on the battery capacity value and the obtained content-related information for at least one data content file, and providing the determined content status to a data presenting unit; and
a control unit connected to the battery level comparing unit and the content status determining unit, said control unit controlling the battery level comparing unit to obtain the battery capacity value, the content status determining unit to obtain the content-related information and to determine the content status, and the data presenting unit to provide information on the determined content status,
wherein the user of the portable electronic device is made aware of the content status of the at least one data content file.

13. The content status information providing unit as claimed in claim 12, wherein the content status determining unit further obtains a consumption size in dependence on the obtained battery capacity value and information related to power consumption for at least a file format of the at least one data content file.

14. The content status information providing unit as claimed in claim 13, wherein said content-related information comprises information related to a size of the at least one data content file, and wherein the content status determining unit determines a size-related quota in dependence on the determined consumption size, and the obtained size of the at least one data content file.

15. The content status information providing unit as claimed in claim 14, wherein the content status determining unit determines an amount of the at least one data content file that is accessible to the user, in relation to the size-related quota.

16. The content status information providing unit as claimed in claim 14, wherein the content status determining unit determines the status that the full amount of the at least one data content file is accessible to the user if the size-related quota is larger than, or equals to, a first threshold.

17. The content status information providing unit as claimed in claim 14, wherein the content status determining unit determines a partial amount of the at least one data content file that is accessible to the user if the size-related quota is smaller than a first threshold.

18. The content status information providing unit as claimed claim 12, wherein the battery level comparing unit determines whether or not the obtained battery capacity value is smaller than a first battery threshold and larger than, or equal to, a second battery threshold.

19. The content status information providing unit as claimed in claim 18, wherein the content status determining unit determines the status that the at least one content data file is locked to the user, if the obtained battery capacity value is smaller than the first battery threshold and larger than, or equal to, the second battery threshold.

20. The content status information providing unit as claimed in claim 18, wherein the content status determining unit determines the status that the at least one content data file is lost, if the obtained battery capacity value is smaller than the second battery threshold.

21. A portable electronic device comprising a content status information providing unit for providing status information related to at least one data content file within the portable electronic device to a user, said content status information providing unit comprising:
a battery level comparing unit for obtaining a battery capacity value related to a battery;
a content status determining unit, connected to the battery level comparing unit, for obtaining content-related information for at least one data content file, said content status determining unit determining content status in dependence on the battery capacity value and the obtained content-related information for at least one data content file, and providing the determined content status to a data presenting unit; and
a control unit connected to the battery level comparing unit and the content status determining unit, said control unit controlling the battery level comparing unit to obtain the battery capacity value, the content status determining unit to obtain the content related information and to determine the content status, and the data presenting unit to provide information on the determined content status,
wherein the user of the portable electronic device is made aware of the content status of the at least one data content file.

22. A computer program product comprising a non-transitory computer readable medium having computer program code stored thereon, said computer program code, when loaded on a portable electronic device, causing the portable electronic device to:
obtain a battery capacity value;
obtain content-related information for at least one data content file;
determine content status information, in dependence on the obtained battery capacity related to the at least one data content file; and
provide the generated content status information to a user, wherein the user of the portable electronic device is made aware of the status of the at least one data content file.

* * * * *